(12) United States Patent
Aho et al.

(10) Patent No.: US 8,914,562 B2
(45) Date of Patent: Dec. 16, 2014

(54) METHOD AND APPARATUS FOR BUFFER INITIALIZATION

(71) Applicant: Nokia Corporation, Espoo (FI)

(72) Inventors: Eero Aho, Tampere (FI); Tomi Aarnio, Tampere (FI); Kimmo Kuusilinna, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/741,007

(22) Filed: Jan. 14, 2013

(65) Prior Publication Data

US 2013/0191560 A1 Jul. 25, 2013

Related U.S. Application Data

(60) Provisional application No. 61/590,555, filed on Jan. 25, 2012.

(51) Int. Cl.
*G06F 3/00* (2006.01)
*G06F 17/30* (2006.01)
*G06F 5/14* (2006.01)
*G06F 13/00* (2006.01)
*G06F 9/445* (2006.01)

(52) U.S. Cl.
CPC ............ *G06F 5/14* (2013.01); *G06F 17/30861* (2013.01); *G06F 8/60* (2013.01)
USPC ............. 710/57; 710/2; 710/5; 710/8; 710/15

(58) Field of Classification Search
None
See application file for complete search history.

(56) References Cited

U.S. PATENT DOCUMENTS

2010/0005464 A1* 1/2010 Malyugin et al. ................. 718/1
2012/0124280 A1* 5/2012 Oner .............................. 711/105

OTHER PUBLICATIONS

OpenCL—The open standard for parallel programming of heterogeneous systems (dated 2013) [online] [retrieved Mar. 8, 2013]. Retrieved from the Internet: <URL: http://www.khronos.org/opencl/>. 3 pages.
WebGL Specification (dated Feb. 2011), (dated 2013) [online] [retrieved Mar. 8, 2013]. Retrieved from the Internet: <URL: http://www.khronos.org/registry/webgl/specs/1.0/>. 79 pages.

* cited by examiner

*Primary Examiner* — Scott Sun
(74) *Attorney, Agent, or Firm* — Alston & Bird LLP (57) ABSTRACT

A method, apparatus and computer program product are provided herein to enable buffer initialization and/or clearance to occur on, for example, a mobile terminal. In some example embodiments, a method is provided that comprises receiving an indication that a buffer has been initialized by a host. The method of this embodiment may also include receiving source code from the host. In some example embodiments, the source code is received from a program running on the host and is configured to cause the buffer that has been initialized by the host to be cleared. The method of this embodiment may also include executing the source code such that the buffer that has been initialized by the host is cleared.

20 Claims, 6 Drawing Sheets

METHOD AND APPARATUS FOR BUFFER INITIALIZATION

RELATED APPLICATIONS

This application claims the benefit of U.S. Provisional Application No. 61/590,555, filed on Jan. 25, 2012, which is incorporated herein by reference in its entirety.

TECHNOLOGICAL FIELD

Embodiments of the present invention relate generally to browsing technology and, more particularly, relate to a method, apparatus, and computer program product for buffer initialization by a compute device.

BACKGROUND

A web browser is a software application for retrieving, presenting, and traversing information resources on the World Wide Web (hereinafter "web"). A web browser can also be defined as an application software or program designed to enable users to access, retrieve and view documents and other resources on the Internet. When operating a web browser, security is crucial. Thus, when operating in a web environment, a user of a device, such as a mobile terminal, may not trust the code that is provided by a remote server for a particular website, document, service or the like. In some cases such code may be malicious.

For example, in some web based technologies (e.g. Hyper Text Markup Language (HTML) 5, JavaScript, Web-based Graphics Library (WebGL), Web-based Computing Language (WebCL)) code may be caused to be executed and/or stored in a buffer on a mobile terminal or other device. By granting access to a buffer and by allowing code to be executed in these buffers, the code may have access to machine specific data to include protected data. For example, the memory buffers that are reserved in WebCL, may contain machine specific data. In such case private data may be accessed and released in a way that would violate the privacy of the user of the device.

BRIEF SUMMARY

A method, apparatus and computer program product are therefore provided according to an example embodiment of the present invention to enable buffer initialization and/or clearance to occur on, for example, a mobile terminal. In particular, a compute device on a mobile terminal may be configured to receive instructions from a host in the form of a kernel or a shader that is built and/or compiled for the compute device. In some example embodiments, the kernel or shader, when executed by the compute device, is configured to cause a buffer to be cleared and/or initialized on the mobile terminal. The host and/or the kernel or shader may, in some embodiments, indicate a current buffer reserved location. Advantageously, for example, the method and systems disclosed herein result in improvement of performance by an example processor and/or a graphics processor.

In some example embodiments, a method is provided that comprises receiving an indication that a buffer has been initialized by a host. The method of this embodiment may also include receiving source code from the host. In some example embodiments, the source code is received from a program running on the host and is configured to cause the buffer that has been initialized by the host to be cleared. The method of this embodiment may also include executing the source code such that the buffer that has been initialized by the host is cleared.

In further example embodiments, an apparatus is provided that includes at least one processor and at least one memory including computer program code with the at least one memory and the computer program code being configured, with the at least one processor, to cause the apparatus to at least receive an indication that a buffer has been initialized by a host. The at least one memory and computer program code may also be configured to, with the at least one processor, cause the apparatus to receive source code from the host. In some example embodiments, the source code is received from a program running on the host and is configured to cause the buffer that has been initialized by the host to be cleared. The at least one memory and computer program code may also be configured to, with the at least one processor, cause the apparatus to execute the source code such that the buffer that has been initialized by the host is cleared.

In yet further example embodiments, a computer program product may be provided that includes at least one non-transitory computer-readable storage medium having computer-readable program instructions stored therein with the computer-readable program instructions including program instructions configured to receive an indication that a buffer has been initialized by a host. The computer-readable program instructions may also include program instructions configured to receive source code from the host. In some example embodiments, the source code is received from a program running on the host and is configured to cause the buffer that has been initialized by the host to be cleared. The computer-readable program instructions may also include program instructions configured to execute the source code such that the buffer that has been initialized by the host is cleared.

In yet further example embodiments, an apparatus is provided that includes means for receiving an indication that a buffer has been initialized by a host. The apparatus of this embodiment may also include means for receiving source code from the host. In some example embodiments, the source code is received from a program running on the host and is configured to cause the buffer that has been initialized by the host to be cleared. The apparatus of this embodiment may also include means for executing the source code such that the buffer that has been initialized by the host is cleared.

In some example embodiments, a method is provided that comprises generating source code configured for operation on a compute device. In some example embodiments, the source code comprises one or more arguments to be set. The method of this embodiment may also include causing a buffer to be initialized in the compute device. The method of this embodiment may also include causing the source code to be transmitted to the compute device. In some example embodiments, the source code is configured to cause the buffer to be cleared.

In further example embodiments, an apparatus is provided that includes at least one processor and at least one memory including computer program code with the at least one memory and the computer program code being configured, with the at least one processor, to cause the apparatus to at least generate source code configured for operation on a compute device. In some example embodiments, the source code comprises one or more arguments to be set. The at least one memory and computer program code may also be configured to, with the at least one processor, cause the apparatus to cause a buffer to be initialized in the compute device. The at least one memory and computer program code may also be configured to, with the at least one processor, cause the apparatus to cause the source code to be transmitted to the compute device. In some example embodiments, the source code is configured to cause the buffer to be cleared.

In yet further example embodiments, a computer program product may be provided that includes at least one non-transitory computer-readable storage medium having computer-readable program instructions stored therein with the computer-readable program instructions including program instructions configured to generate source code configured for operation on a compute device. In some example embodiments, the source code comprises one or more arguments to be set. The computer-readable program instructions may also include program instructions configured to cause a buffer to be initialized in the compute device. The computer-readable program instructions may also include program instructions configured to cause the source code to be transmitted to the compute device. In some example embodiments, the source code is configured to cause the buffer to be cleared.

In yet further example embodiments, an apparatus is provided that includes means for generating source code configured for operation on a compute device. In some example embodiments, the source code comprises one or more arguments to be set. The apparatus of this embodiment may also include means for causing a buffer to be initialized in the compute device. The apparatus of this embodiment may also include means for causing the source code to be transmitted to the compute device. In some example embodiments, the source code is configured to cause the buffer to be cleared.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. The term "kernel," may refer to source code or an executable, and should be understood to encompass implementations using a general purpose programming model (such as the language C) and special purpose programming models (such as pixel shaders). Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

In various computing systems, there is often a need to allocate memory buffers (that is, areas of memory) and initialize those buffers with zeros or some other predefined values. If an application were allowed to access uninitialized buffers, it could, for example, retrieve confidential information left behind by the process or application that was previously using that piece of memory. This scenario must be prohibited, particularly in environments where application code may be untrusted and potentially malicious. Such environments include, in particular, the web browser.

Some computing systems can be conceptually divided into a host, which is typically a CPU (central processing unit), and a set of compute devices. A compute device may be, for example, a GPU (graphics processing unit), a single-core, multi-core or many-core CPU, a DSP (Digital Signal Processor), a multimedia accelerator, or the like. The host processor itself may also be used as a compute device. These types of computing systems include, but are not limited to: OpenCL (Open Computing Language) and its derivatives such as WebCL; OpenGL (Open Graphics Library) and its derivatives such as OpenGL embedded systems (ES) and WebGL; Direct3D, DirectCompute, and other components of DirectX; Silverlight 3D; Macromedia Flash Stage3D; and many others. If these systems are made available to untrusted applications (such as in the web browser environment), it is important that no uninitialized memory buffers are exposed. In particular, it is not sufficient to clear any buffers that reside on the host processor's memory space: any buffers that reside on the compute devices' address space(s) must also be cleared.

Traditionally, memory buffers that reside on compute devices have been initialized by a piece of code that runs on the host processor and writes zeros (or any other values) to those buffers. This is illustrated by the following piece of pseudo code:

```
1. clear_buff = createZeroBufferInHost(clear_size);
2. buff = createBufferInDevice(buff_size);
3. loop(i=0; i<buff_size; i+=clear_size) {
4. writeBufferToDevice(buff[i], clear_buff);
```

On line number 1, a buffer called "clear_buff" of size "clear_size" is reserved by the host. The buffer contents are initialized, in this example, to zero (e.g. could also be all bits as one or repeating any other known bit pattern). In some example implementations "clear_buff" may not be reserved each time that it is required, but instead may be reserved only once during a session. On line number 2, a buffer called "buff" of size "buff_size" is created into an area of memory that the compute device can access (instead of, or in addition to, the host). On lines 3-4, the "clear_buff" contents are written to the "buff" buffer in a loop (this example assumes that "clear_buff" is smaller than "buff").

By way of further example, the following function in the application programming interface (API) of WebCL may be used to create a buffer that is accessible by a compute device:

```
var buff=ctx.createBuffer(bufSize);
```

In the implementation of the above createBuffer API function, the following steps may be included:
1. Reserve "bufSize" bytes of memory from the compute device.
2. Initialize that buffer.

Buffer reservation (step 1) may be accomplished, for example, by using the clCreateBuffer, clCreateSubBuffer, clCreateImage2D, or clCreateImage3D OpenCL host API function provided by the underlying OpenCL driver (e.g. buff=clCreateBuffer(ctx, CL_MEM_READ_WRITE, buff_size, NULL, &ciErrNum)). Buffer initialization may then be accomplished by using an OpenCL host API function such as clEnqueueWriteBuffer, which is configured to write blocks of data containing zeros to the device. This method of initialization is exemplified by the following code fragment:

```
1. while (wrt_offset + clear_size < buff_size){
2. clEnqueueWriteBuffer(commandQueue, buff, CL_FALSE, wrt_offset, clear_size, clear_buff,...);
3. wrt_offset += clear_size;
4. }
5. clEnqueueWriteBuffer(commandQueue, buff, CL_TRUE, wrt_offset, (buff_size-wrt_offset), clear_buff,...);
```

There is a similar need to initialize memory buffers in other systems outside of OpenCL and WebCL. For example in WebGL, textures, vertex buffers, framebuffers, and others must be initialized before allowing application code to access them. This is typically done in the same way as shown above, using the API functions that are available in the underlying OpenGL, OpenGL ES, or Direct3D driver. For example, a texture can be cleared to zero by providing a suitably sized, zero-initialized buffer to the glTexImage2D function, or as another alternative, calling glTexSubImage2D multiple times with a smaller zero-initialized buffer as a parameter.

The traditional method of initializing device-side memory buffers, as explained in the above paragraphs, has at least two drawbacks: first, it may take a long time to complete on some systems, and second, it consumes extra memory on the host side. As a result, the traditional method may deteriorate system performance and ultimately the end-user's experience.

Figure 1:
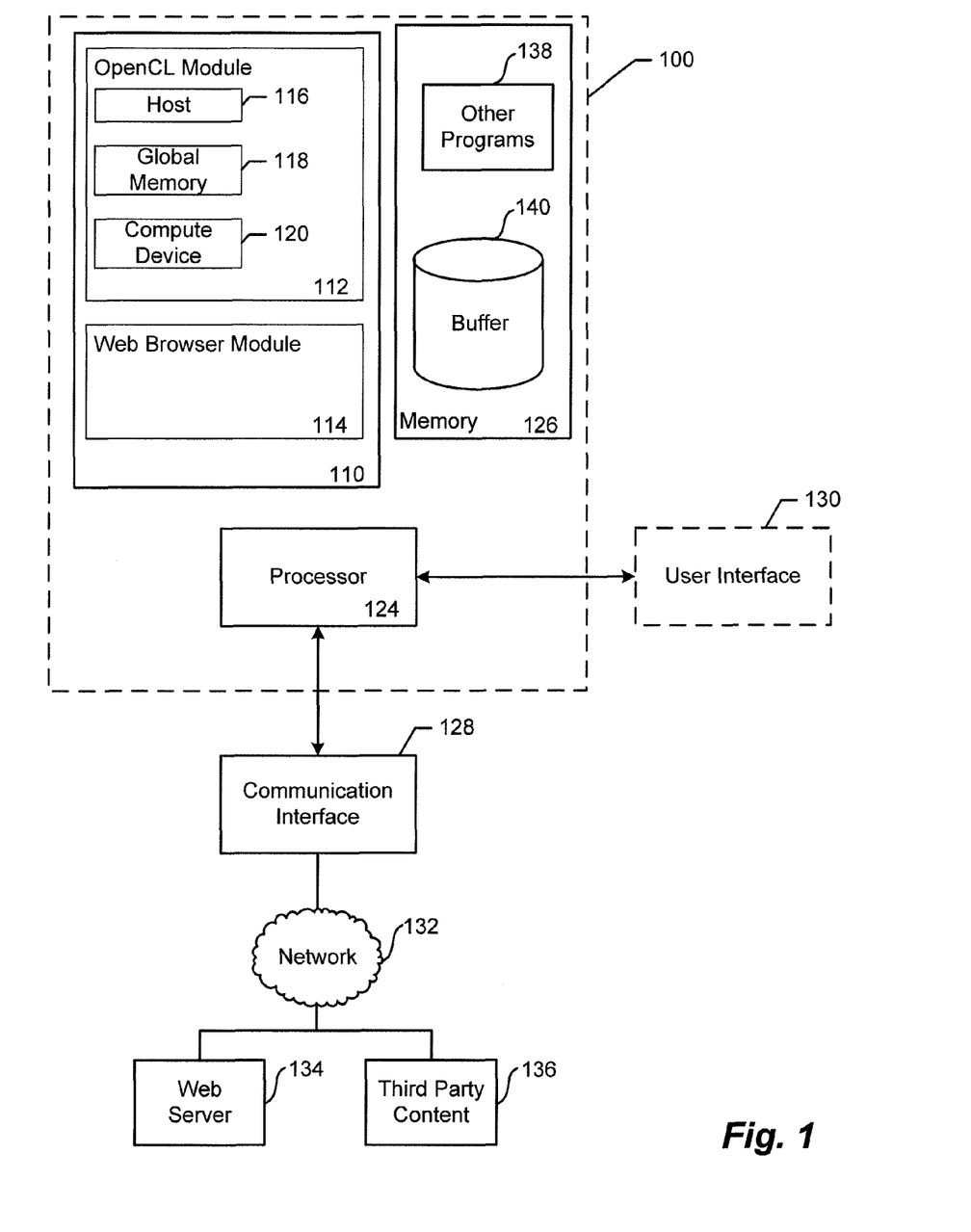
FIG. 1 is an example block diagram of an example computing system for practicing embodiments of an example buffer initialization and clearing system in accordance with some example embodiments of the present invention.

FIG. 1 is an example block diagram of an example computing system for practicing embodiments of an example buffer initialization and clearing system 110 in accordance with an embodiment of the present invention. In particular the buffer initialization and clearing system 110 may be configured to initialize and clear a buffer on a device based on a kernel received from a host.

FIG. 1 shows a system 100 that may be utilized to implement a buffer initialization and clearing system 110. Note that one or more general purpose or special purpose computing systems may be used to implement the buffer initialization and clearing system 110, such as but not limited to the mobile terminal 10 of FIG. 2. In addition, the system 100 may comprise one or more distinct computing systems and may span distributed locations. Furthermore, each block shown may represent one or more such blocks as appropriate to a specific embodiment or may be combined with other blocks. For example, in some embodiments the system 100 may contain an OpenCL module 112 and/or a web browser module 114. In other example embodiments, an OpenCL module 112 and/or a web browser module 114 may be configured to operate on separate systems (e.g. a mobile terminal and a remote server, multiple remote servers and/or the like). For example, the OpenCL module 112 and/or the web browser module 114 may be configured to operate on a mobile terminal, such as mobile terminal 10 of FIG. 2. Also, the buffer initialization and clearing system 110 may be implemented in software, hardware, firmware, or in some combination to achieve the capabilities described herein.

Figure 2:
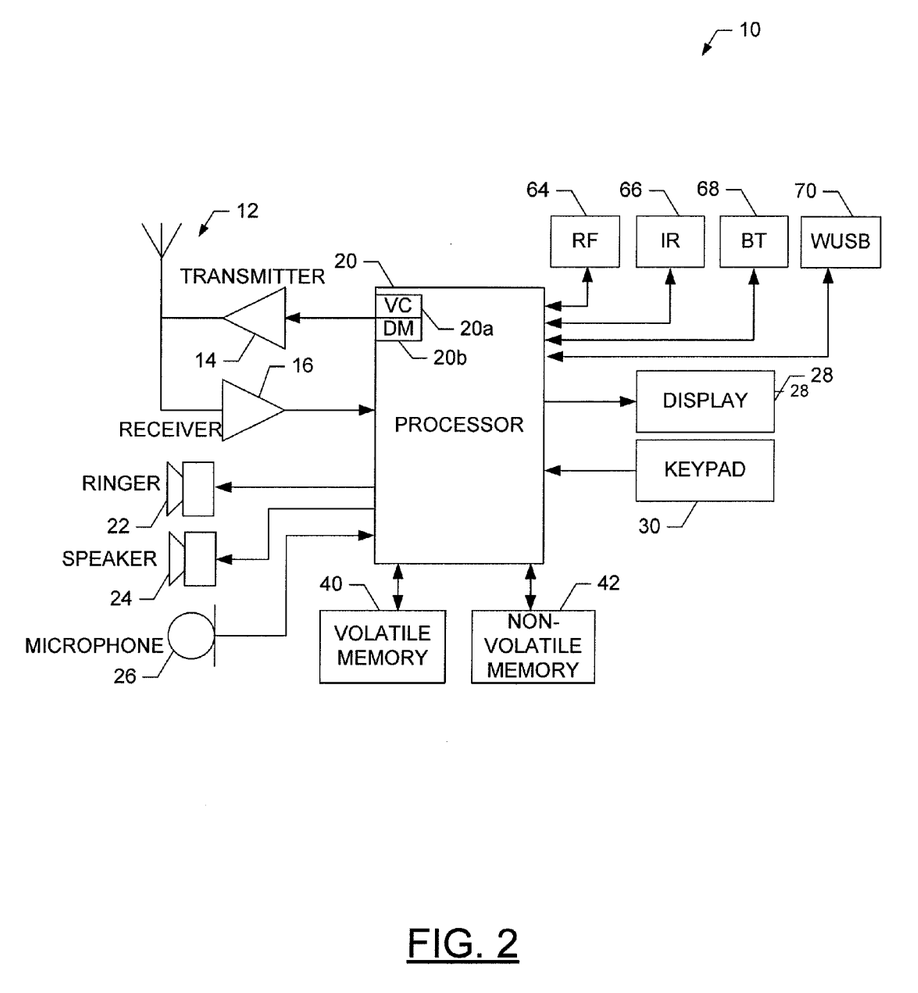
FIG. 2 illustrates a block diagram of a mobile terminal representative of some example embodiments of a buffer initialization and clearing system.

The example OpenCL module 112 in some example embodiments that is configured to implement OpenCL programs. However, in other embodiments, the OpenCL module 112 may also be configured to execute WebCL; OpenGL and its derivatives such as OpenGL embedded systems (ES) and WebGL; Direct3D, DirectCompute or the like programs. For example the OpenCL module may include a host 116, a global memory 118 and/or one or more compute devices 120. The host 116 may take the form of or be embodied by a processor, such as processor 124, and may be configured such that a host program running on a host may execute a kernel on a device. The host 116 may be configured to submit various commands to perform various computations on the compute device 120. The compute device 120 may comprise or be embodied by the processor 124, a graphics processing unit, a multicore processing unit, digital signal processing unit, hardware accelerator or the like. To execute the kernel, the host 116 may designate a number of work-groups and a number of work-items. The host 116 may also manipulate memory objects such as the global memory 118. The global memory 118 in some embodiments may comprise or be embodied by memory 126. The global memory 118 is a memory region that is accessible to all work items executed in the Compute Device 120. Alternatively or additionally other memory types may be reserved, such as but not limited to local memory, private memory and/or constant memory.

In some example embodiments, the compute device 120 is configured to receive instructions relating to the creation and initialization of a buffer from the host 116. The example compute device 120 may then be configured to clear a reserved buffer, for example buffer 140 in memory 126 using OpenCL kernel code, OpenGL shader code, or the like.

In some example embodiments, an example web browser module 114 embodied for example by a web browser, may be configured to receive WebCL code from a web server, such as web server 134 via a communications interface 128. In some example embodiments, the web browser module 114 may receive a WebCL API function, such as ctx.createBuffer( ) from the web server 134. The function is configured to reserve buffer space from the global memory 118. The ctx.create-Buffer( ) function may then be implemented in the web browser module 114 by using OpenCL specific functions that reserve and clear the memory buffer, such as buffer 140.

While the system 100 may be employed, for example, by a mobile terminal and/or a stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In some example embodiments, system 100 comprises a computer memory ("memory") 126, one or more processors 124 (e.g. processing circuitry) and a communications interface 128. The buffer initialization and clearing system 110 is shown residing in memory 126. In other embodiments, some portion of the contents, some or all of the components of the buffer initialization and clearing system 110 may be stored on and/or transmitted over other computer-readable media. The components of the buffer initialization and clearing system 110 preferably execute on one or more processors 124. The modules may be implemented by, embodied by and/or configured to execute on the processor 124. Other code or programs 138 (e.g., an administrative interface, a Web server, and the like) and potentially other data repositories, such as buffer 140, also reside in the memory 126, and preferably execute on processor 124. Of note, one or more of the components in FIG. 1 may not be present in any specific implementation.

In a typical embodiment, as described above, the buffer initialization and clearing system 110 may include an OpenCL module 112 and/or a web browser module 114. The buffer initialization and clearing system 110 may interact via the network 132 via a communications interface 128 with web server 134 and/or with third-party content 136. The network 132 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 128 may be capable of operating with one or more air interface standards, communication protocols, modulation types, access types, and/or the like. More particularly, the system 100, the communications interface 128 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The system 100 may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the buffer initialization and clearing system 110 may be implemented using standard programming techniques. For example, the buffer initialization and clearing system 110 may be implemented as a "native" executable running on the processor 124, along with one or more static or dynamic libraries. In other embodiments, the buffer initialization and clearing system 110 may be implemented as instructions processed by a virtual machine that executes as one of the other programs 138. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, OpenCL C, OpenGL shading language, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the buffer initialization and clearing system 110, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the buffer initialization and clearing system 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The system 100 may be embodied as and/or implemented such as, for example, by a desktop computer, laptop computer, mobile terminal, mobile computer, mobile phone, smartphone, mobile communication device, user equipment, tablet computing device, pad, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

In some example embodiments, the system 100, such as by the buffer initialization and clearing system 110 implementing the OpenCL module 112 may be configured to generate a kernel, executed by host 116 which may include but is not limited to:

```
1. kernel = build( kernelSource );
2. buff = createBufferInDevice(buff_size);
3. thread_count = buff_size;
4. executeKernel("initializeBuffer", thread_count, buff );
```

Respectively, the kernel is depicted in pseudo code as follows, but is not limited to:

```
5. initializeBuffer ( buff ) {
6. i = thread_index;
7. buff [i] = 0;
8. }
```

By way of example and as shown with reference to line number 1, the kernel may be compiled and built as kernel binary for a compute device 120. In some example embodiments, the compile and build for the kernel may be executed once for the same kernel. Alternatively or additionally the kernel may be compiled prior to lines 2-8.

The kernel binary described herein may refer to real executable binary or some intermediate format that may be interpreted or further compiled before execution. For example, as shown with reference to line 2, the actual buffer, such as buffer 140, may be caused to be created in the global memory 118. For example, as shown with reference to lines 3 and 4, a kernel may be executed with thread_count equal to buffer size. In other words, the kernel may be executed "buff_size" times. In an instance in which the kernel is executed on the compute device 120 and in some example embodiments, the buffer "buff," such as buffer 140 may be cleared in line number 7. Alternatively or additionally, a single address may be cleared in the buffer in line number 7. The kernel may then be executed for each of a various number of buffer addresses (e.g. executed same amount of times as the buffer size "buff_size").

In some example embodiments, OpenCL host code is implemented in a web browser, such as web browser module 114, and executed in Host 116 and may use OpenCL functions that reserve and clear a buffer, such as buffer 140. The OpenCL host code may include but is not limited to:

```
1. buff  =  clCreateBuffer(ctx,  CL_MEM_READ_WRITE,
buff_size, NULL, &ciErrNum);
2. clSetKernelArg(kernel, 0, sizeof(cl_mem), (void*)&buff);
3. clSetKernelArg(kernel, 1, sizeof(cl_uint), (void*)&buff_size);
4. // Set global and local work sizes for kernel
5. localWorkSize[0] = 64;
6. globalWorkSize[0] = roundUp(localWorkSize[0], buff_size/4);
7. clEnqueueNDRangeKernel(commandQueue, kernel,  1,
NULL,   globalWorkSize, localWorkSize,...);
8. clFinish(commandQueue);
```

In some example embodiments, the kernel may comprise but is not limited to:

```
9. ___kernel void clearBuffer(___global unsigned int* buffer,
unsigned  int bufferByteCount){
10. int x = get_global_id(0);
11. //Bound check since get_global_id(0) may give some extra values
in some circumstances
12. if( x >= (bufferByteCount/4) )
13. { return; }
14. buffer[x] = 0;
15. return;
16.}
```

As is described herein, the above referenced kernel is created by a Web Browser Module 114, OpenCL Module 112 and/or host 116 and is in some example embodiments configured to be executed by the compute device 120. For example, the kernel may be received by the system 100, and when executed by the compute device 120 may cause a buffer to be cleared and/or initialized.

By way of example and with reference to lines 2 and 3, kernel arguments may be determined and are set, such as by host 116. In lines 5 and 6, OpenCL specific local and global work sizes are defined, such as by processor 124. In line 7, the kernel is sent for execution on the compute device 120. In line 8, the execution on the host processor 124 is blocked for so long that the operations in the compute device 120 are finished. In some example embodiments, the operations are blocked to ensure that the buffer is cleared (before it may be read). Alternatively or additionally, in an instance in which the operations are done in a particular order (e.g. only a single in-order command queue in OpenCL), then, in some example embodiments, blocking may not be needed since any possible read operation always occurs after buffer clearance.

In some example embodiments, and in an instance in which the kernel is executed by the compute device 120, a global identifier is extracted in line 10. With reference to lines 12 and 13, an example bound check is executed, such as by the compute device 120 or the like, because in some instances extra work items (extra threads) may be executed. In line number 16, the buffer, such as buffer 140, may be initialized, such as by the compute device 120, the OpenCL module 112, or the like. In some example embodiments the kernel is executed buff_size/4 times. Division by four may be used because 32 bits (4 bytes) are initialized at a time in the kernel. Alternatively or additionally other values may be used based on a determined buffer size, characteristics of the device and/or the like.

In some example embodiments, a buffer initialization and clearing system 110 may be embodied as a mobile terminal, such as that illustrated in FIG. 2. In this regard, FIG. 2 illustrates a block diagram of a mobile terminal 10 representative of one embodiment of a buffer initialization and clearing system 110. It should be understood, however, that the mobile terminal 10 illustrated and hereinafter described is merely illustrative of one type of system (i.e., buffer initialization and clearing system 110) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (VAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20$a$, an internal data modem (DM) 20$b$, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

FIGS. 3-6 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3-6, when executed, convert a computer or processing circuitry into a particular machine configured to perform an example embodiment of the present invention. Accordingly, the operations of FIGS. 3-6 define an algorithm for configuring a computer or processing to perform an example embodiment. In some cases, a general purpose computer may be provided with an instance of the processor which performs the algorithms of FIGS. 3-6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Figure 3:
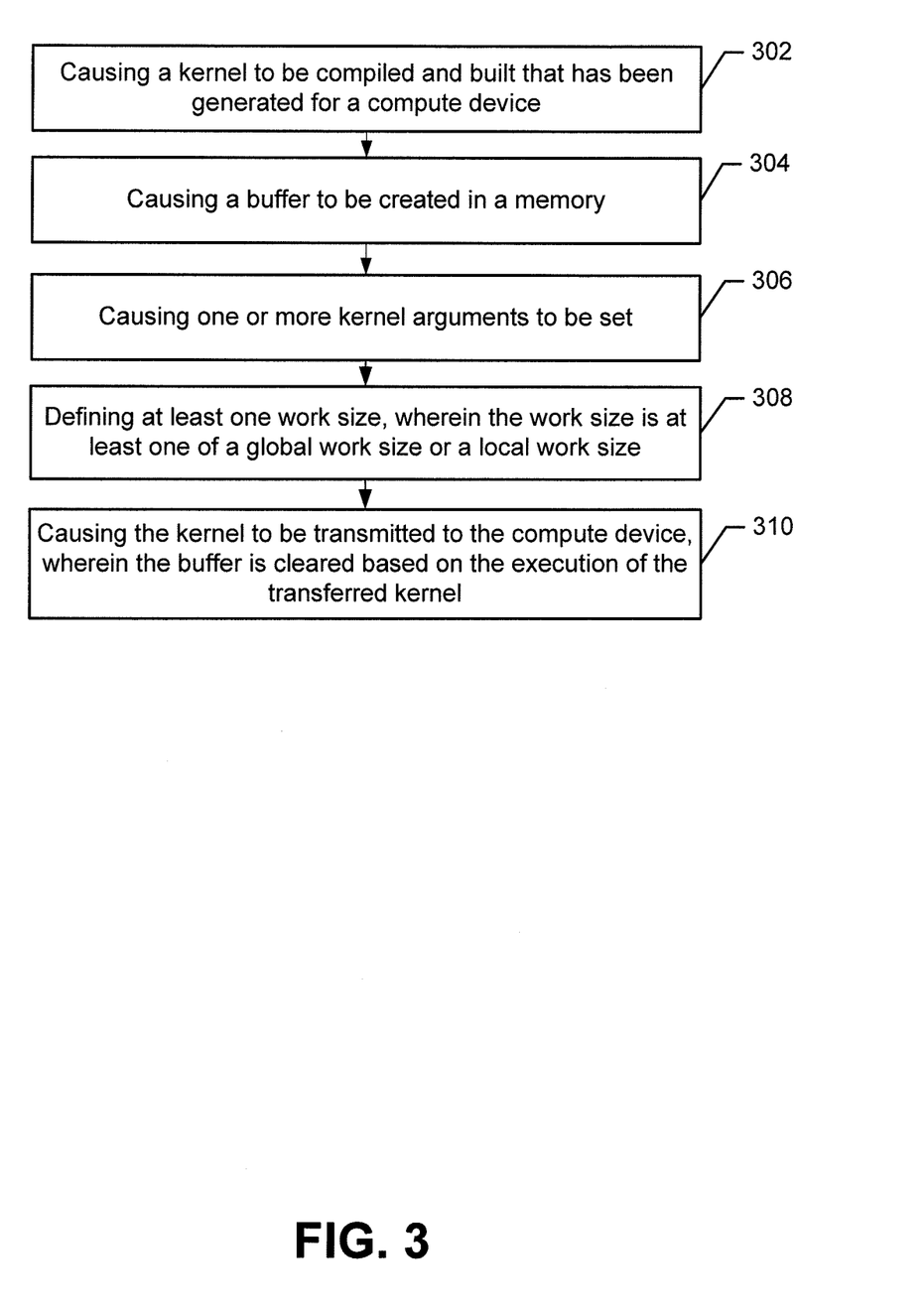
FIG. 3 is an example flowchart illustrating a method of hosting the buffer creation and clearance performed in accordance with an embodiment of the present invention.

FIG. 3 is an example flowchart illustrating a method of hosting the buffer creation and clearance performed in accordance with an embodiment of the present invention. As shown in operation 302, the OpenCL module 112 may include means, such as the host 116 or the like for causing a kernel to be compiled and built that has been generated for a compute device. As shown in operation 304, the OpenCL module 112 may include means, such as the host 116 or the like for causing a buffer to be created in a memory. As shown in operation 306, OpenCL module 112 may include means, such as the host 116 or the like for causing one or more kernel arguments to be set. As shown in operation 308, the OpenCL module 112 may include means, such as the host 116 or the like for defining at least one work size, wherein the work size is at least one of a global work size or a local work size. As shown in operation 310, OpenCL module 112 may include means, such as the host 116 or the like for causing the kernel to be transmitted to the compute device, wherein the buffer is cleared by executing the kernel.

Figure 4:
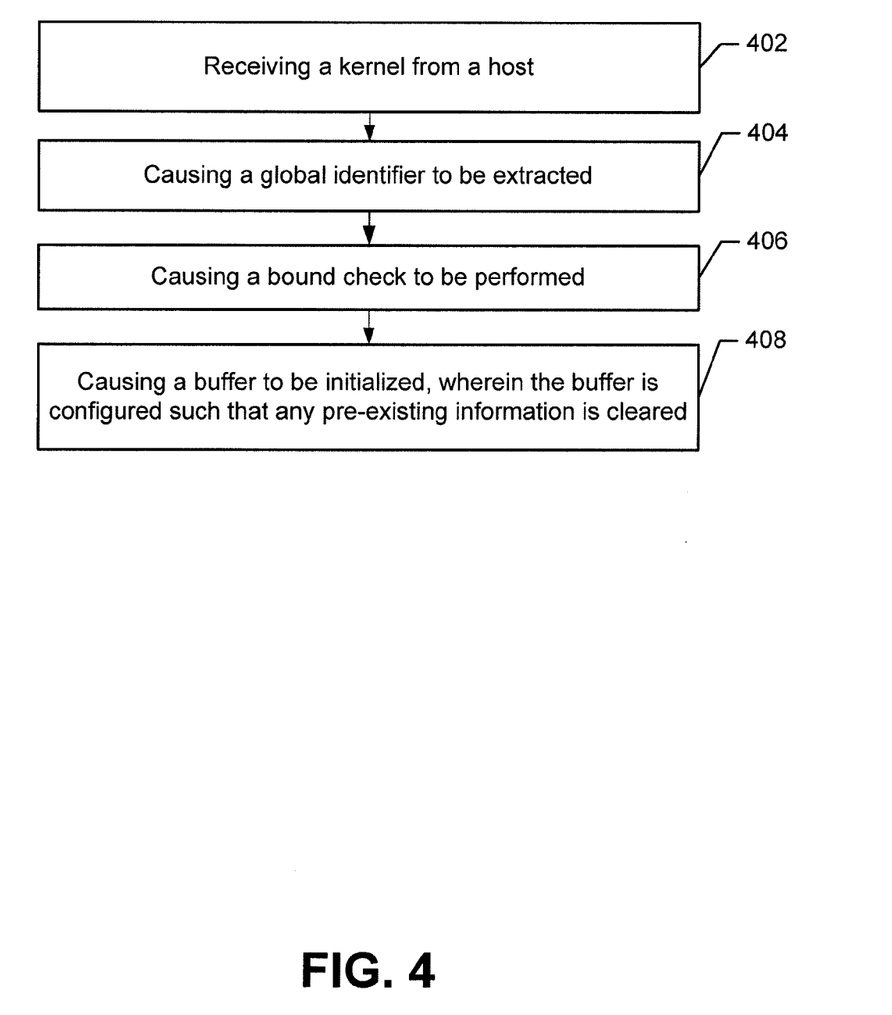
FIG. 4 is an example flowchart illustrating a method of operating a buffer initialization and clearing system performed in accordance with an embodiment of the present invention.

FIG. 4 is an example flowchart illustrating a method of operating a buffer initialization and clearing system performed in accordance with an embodiment of the present invention. As shown in operation 402, the buffer initialization and clearing system 110 may include means, such as the Compute Device 120, the processor 124, the OpenCL module 112, and the web browser module 114 or the like for receiving a kernel from a host. As shown in operation 404, the buffer initialization and clearing system 110 may include means, such as the Compute Device 120, the processor 124, the OpenCL module 112, the web browser module 114 or the like for causing a global identifier to be extracted. As shown in operation 406, the buffer initialization and clearing system 110 may include means, such as the Compute Device 120, the processor 124, the OpenCL module 112, the web browser module 114 or the like for causing a bound check to be performed. As shown in operation 408, the buffer initialization and clearing system 110 may include means, such as the Compute Device 120, the processor 124, the OpenCL module 112, the web browser module 114 or the like for causing a buffer to be initialized, wherein the buffer is configured such that mobile terminal specific information is cleared.

Alternatively or additionally, the systems and methods as described herein may be implemented using the clCreateSubBuffer function in the OpenCL API. Assume that a WebCL application requests a read-only buffer to be created, for example by calling createBuffer with the parameter CL_MEM_READ_ONLY. Now, the WebCL implementation may first create a read/write buffer by calling clCreateBuffer with the flag CL_MEM_READ_WRITE. Unlike a read-only buffer, a read/write buffer can be cleared by the kernel. Once the buffer has been cleared, the WebCL implementation may create a read-only "view" to the same buffer by calling clCreateSubBuffer with the flag CL_MEM_READ_ONLY. This read-only buffer is then returned to the application.

In WebGL, the equivalent to a WebCL kernel is called a shader. Thus, the methods of FIGS. 3 and 4 may be implemented in WebGL (see FIGS. 5 and 6) and also in other programming frameworks.

Figure 5:
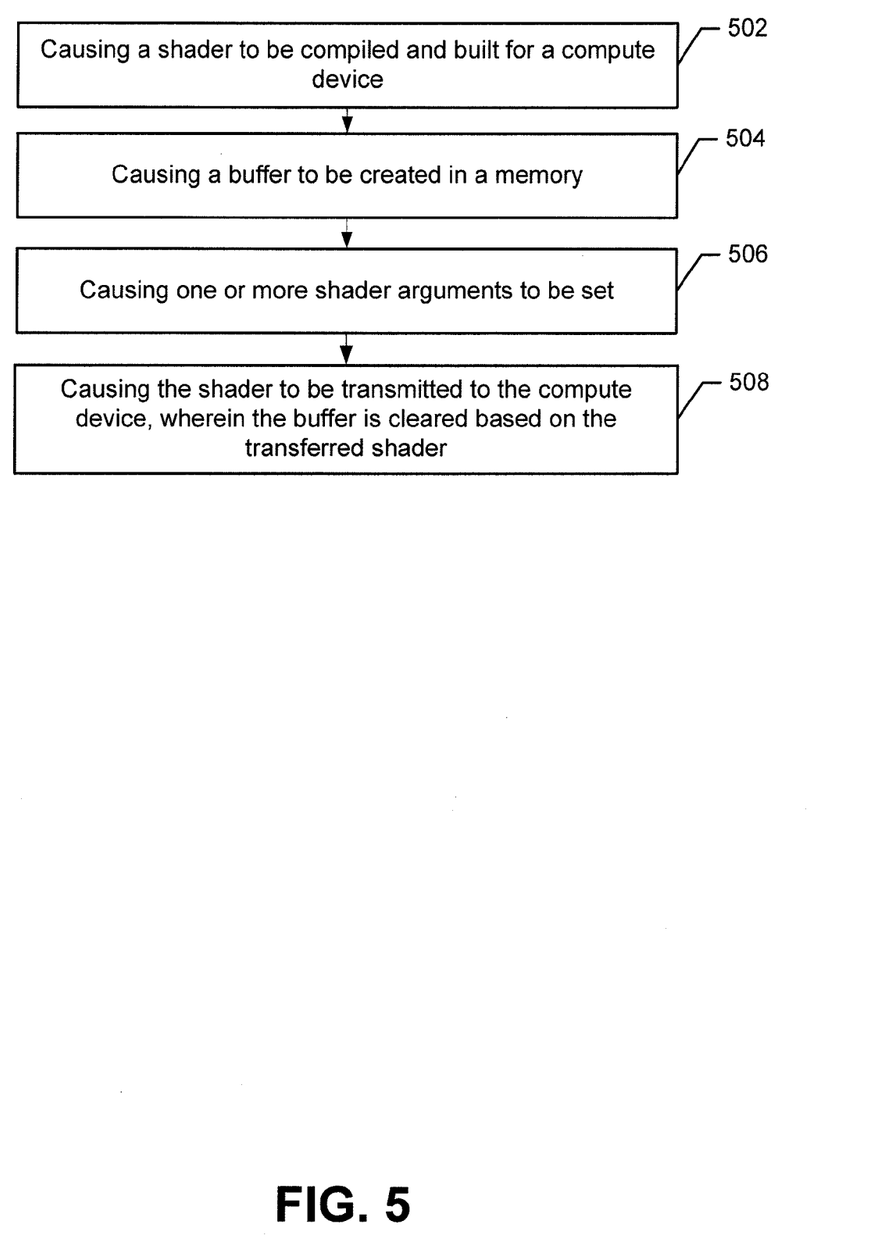
FIG. 5 is an example flowchart illustrating a method of hosting the buffer creation and clearance performed in WebGL and in accordance with an embodiment of the present invention.

FIG. 5 is an example flowchart illustrating a method of hosting the buffer creation and clearance performed in WebGL and in accordance with an embodiment of the present invention. As shown in operation 502, the buffer initialization and clearing system 110 may include means, such as the host 116 or the like for causing a shader to be compiled and built for a compute device. As shown in operation 504, the buffer initialization and clearing system 110 may include means, such as the host 116 or the like for causing a buffer to be created in a memory. As shown in operation 506, the buffer initialization and clearing system 110 may include means, such as the host 116 or the like for causing one or more shader arguments to be set. As shown in operation 508, the buffer initialization and clearing system 110 may include means, such as the host 116 or the like for causing the shader to be transmitted to the compute device, wherein the buffer is cleared by executing the shader.

Figure 6:
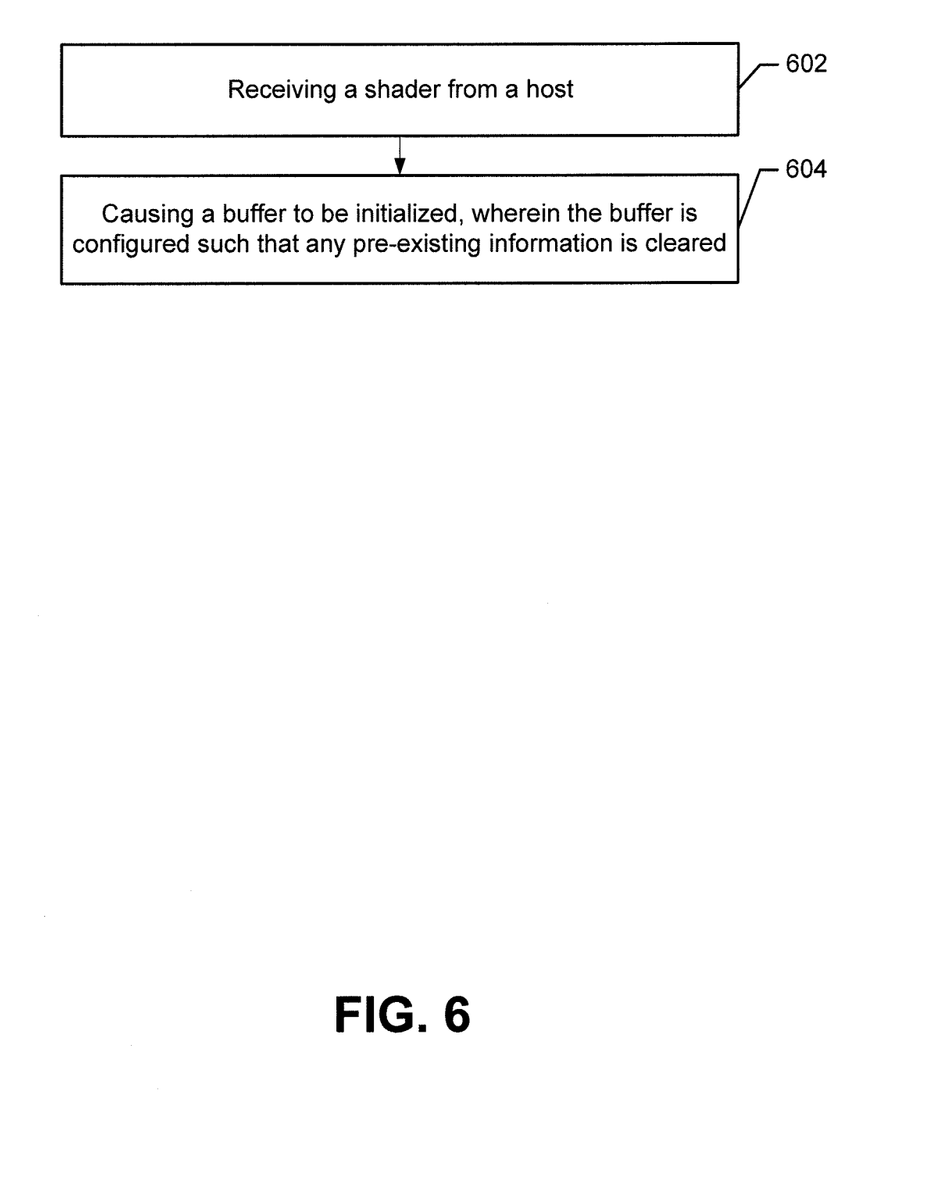
FIG. 6 is an example flowchart illustrating a method of operating a buffer initialization and clearing system performed in WebGL and in accordance with an embodiment of the present invention.

FIG. 6 is an example flowchart illustrating a method of operating a buffer initialization and clearing system performed in WebGL and in accordance with an embodiment of the present invention. As shown in operation 602, the buffer initialization and clearing system 110 may include means, such as the Compute Device 120, the processor 124, and the web browser module 114 or the like for receiving a shader from a host. As shown in operation 604, the buffer initialization and clearing system 110 may include means, such as the Compute Device 120, the processor 124, the web browser module 114 or the like for causing a buffer to be initialized, wherein the buffer is configured such that mobile terminal specific information is cleared.

Advantageously, the systems and methods as described herein result in an improved performance when a buffer is initialized by the device. Additionally, no extra memory buffers need to be reserved from the host just for the purpose of storing zeros or other predefined values. While the kernel is compiled in some embodiments, such compilation may only occur once, for example.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving an indication that a buffer has been initialized by a host;
determining a buffer size, wherein the buffer size is configurable to be less than the size of the buffer initialized by the host;
receiving from a server, remote from the host, source code for execution on the host, wherein the source code is generated by a program accessed via the host, and wherein the source code is configured, upon execution, to cause at least a portion of the buffer, in accordance with the buffer size, that has been initialized by the host to be cleared; and
executing, using a processor, the source code such that at least a portion of the buffer that has been initialized by the host is cleared, wherein in an instance in which the buffer is cleared, the program is unable to access any pre-existing information in the buffer.

2. A method according to claim 1, wherein the source code is at least one of kernel source code or shader source code, wherein the at least one of the kernel source code or the shader source code is generated remote from the host for operation by a compute device.

3. A method according to claim 1, further comprising:
receiving a designated number of work-groups and a number of work-items from the host.

4. A method according to claim 1, wherein the source code comprises one or more arguments to be set.

5. A method according to claim 3, wherein the one or more arguments are at least one of kernel arguments or shader arguments.

6. A method according to claim 1, wherein the source code is executed a predetermined number of times to clear the buffer and wherein a read operation is caused to be blocked until the buffer is determined to be cleared.

7. A method according to claim 1, further comprising:
determining a global identifier in the source code; and
causing a bound check to be performed on the global identifier.

8. An apparatus comprising:
   at least one processor; and
   at least one memory including computer program code, the at least one memory and the computer program code configured to, with the at least one processor, cause the apparatus to at least:
   receive an indication that a buffer has been initialized by a host;
   determine a buffer size, wherein the buffer size is configurable to be less than the size of the buffer initialized by the host:
   receive from a server, remote from the host, source code for execution on the host, wherein the source code is generated by a program accessed via the host, and wherein the source code is configured, upon execution, to cause at least a portion of the buffer, in accordance with the buffer size, that has been initialized by the host to be cleared; and
   execute the source code such that at least a portion of the buffer that has been initialized by the host is cleared, wherein in an instance in which the buffer is cleared, the program is unable to access any pre-existing information in the buffer.

9. An apparatus according to claim 8, wherein the source code is at least one of kernel source code or shader source code, wherein the at least one of the kernel source code or the shader source code is generated remote from the host for operation by a compute device.

10. An apparatus according to claim 8, wherein the at least one memory including the computer program code is further configured to, with the at least one processor, cause the apparatus to:
   receive a designated number of work-groups and a number of work-items from the host.

11. An apparatus according to claim 8, wherein the source code comprises one or more arguments to be set.

12. An apparatus according to claim 11, wherein the one or more arguments are at least one of kernel arguments or shader arguments.

13. An apparatus according to claim 8, wherein the source code is executed a predetermined number of times to clear the buffer and wherein a read operation is caused to be blocked until the buffer is determined to be cleared.

14. An apparatus according to claim 8, wherein the at least one memory including the computer program code is further configured to, with the at least one processor, cause the apparatus to:
   determine a global identifier in the source code; and
   cause a bound check to be performed on the global identifier.

15. A method comprising:
   generating, using a processor, source code configured for operation on a compute device, wherein the source code comprises one or more arguments to be set;
   causing a buffer to be initialized in the compute device; and
   causing the source code to be transmitted to the compute device, wherein the source code is configured to cause the buffer to be cleared.

16. A method according to claim 15, wherein the source code is at least one of kernel source code or shader source code.

17. A method according to claim 15, wherein the one or more arguments are at least one of kernel arguments or shader arguments.

18. A method according to claim 15, further comprising:
   determining a work size, wherein the work size is at least one of a global work size or a local work size.

19. A method according to claim 15, further comprising:
   causing a global memory in the compute device to be manipulated, wherein the global memory is a memory region accessible by one or more work items.

20. A method according to claim 15, wherein the source code is executed on the compute device a predetermined number of times to clear the buffer.

* * * * *